United States Patent
Moravec et al.

(10) Patent No.: US 12,445,323 B2
(45) Date of Patent: Oct. 14, 2025

(54) SYSTEM AND METHOD FOR REDUCING A POWER CONSUMPTION OF A VEHICLE REAR LAMP

(71) Applicant: HELLA AUTOTECHNIK NOVA s.r.o., Mohelnice (CZ)

(72) Inventors: Pavel Moravec, Svinov (CZ); Krzysztof Gociek, Lyžbice (CZ); Martin Korený, Hradec nad Moravicí (CZ)

(73) Assignee: HELLA AUTOTECHNIK NOVA s.r.o., Mohelnice (CZ)

( * ) Notice: Subject to any disclaimer, the term of this patent is extended or adjusted under 35 U.S.C. 154(b) by 223 days.

(21) Appl. No.: 18/330,881

(22) Filed: Jun. 7, 2023

(65) Prior Publication Data

US 2023/0412419 A1 Dec. 21, 2023

(30) Foreign Application Priority Data

Jun. 15, 2022 (CZ) .................................. CZ2022-265

(51) Int. Cl.
*H04L 12/40* (2006.01)
*B60Q 11/00* (2006.01)

(52) U.S. Cl.
CPC ...... *H04L 12/40039* (2013.01); *B60Q 11/007* (2013.01); *H04L 2012/40215* (2013.01); *H04L 2012/40234* (2013.01)

(58) Field of Classification Search
CPC ..... H04L 12/40039; H04L 2012/40215; H04L 2012/40234; B60Q 11/007; B60Q 1/26; B60Q 1/22; B60Q 1/24
USPC .......................................................... 709/253
See application file for complete search history.

(56) References Cited

U.S. PATENT DOCUMENTS

| 6,865,458 | B1 * | 3/2005 | Kim ..................... B60R 16/0315 |
| | | | 701/32.7 |
| 2021/0033056 | A1 * | 2/2021 | Daly ........................ H04L 12/40 |

* cited by examiner

*Primary Examiner* — Adil Ocak
(74) *Attorney, Agent, or Firm* — Husch Blackwell LLP

(57) ABSTRACT

A system and method are provided for reducing a power consumption of a vehicle rear lamp. A vehicle data bus, a power supply, at least one light source, and at least one rear lamp control unit are provided. The at least one rear lamp control unit is connected to the light source, and is adapted to power the light source. The rear lamp control unit is connected to the vehicle data bus and the power supply. A switch and a switch control unit are also provided, with the switch control unit being connected to the switch and adapted to close the switch and to open the switch. The switch is connected between the power supply and the rear lamp control unit. The switch control unit is connected to the vehicle data bus.

18 Claims, 6 Drawing Sheets

SYSTEM AND METHOD FOR REDUCING A POWER CONSUMPTION OF A VEHICLE REAR LAMP

CROSS REFERENCE

This application claims priority to Czech Republic Application No. PV 2022-265, filed Jun. 15, 2022, the entirety of which is hereby incorporated by reference.

FIELD OF THE INVENTION

The present invention relates to a system for reducing a power consumption of a vehicle rear lamp, wherein, in particular, it relates to an external circuit connected to a hybrid integrated circuit of the rear lamp. Furthermore, the present invention relates to a method for reducing the power consumption of the vehicle rear lamp using this system.

BACKGROUND OF THE INVENTION

In the current state of the art, a hybrid integrated circuit is used for connecting and controlling the vehicle rear lights, which is connected to a vehicle data bus, most often to a CAN (Controller Area Network) bus. The CAN bus provides communication between individual vehicle modules, wherein in addition to the front and rear lights, it is possible to mention, for example, controlling the doors, locks, wipers, electrically controlled seats or air condition units. Another type of a bus, LIN (Local Interconnect Network), is also used to communicate with other peripheral devices, such as mirrors or windows.

The hybrid integrated circuit of the rear lamp comprises two power supply branches—a logic branch for powering an internal logic of the hybrid integrated circuit, and a power branch for powering the LEDs in the rear lamp. These branches are powered from a power supply (a car battery), wherein the powering of the power branch can be switched off after entering the OFF command to the hybrid integrated circuit, which of course reduces the power consumption. However, even in this case when the power branch is not powered, the electrical energy consumption is not low enough, because the logic branch is still powered. Nowadays, a great emphasis is placed on the requirement of the low power consumption, for example, for environmental reasons.

Therefore, it would be desirable to come up with a solution that would provide even lower power consumption of the rear lamp compared to the known solutions, where the power consumption is reduced only by switching off the powering of the power branch of the hybrid integrated circuit while the logic branch of the hybrid integrated circuit is still on.

BRIEF SUMMARY OF THE INVENTION

The disadvantages of the solutions known in the state of the art are to some extent eliminated by a system for reducing a power consumption of a vehicle rear lamp comprising a vehicle data bus, a power supply, at least one light source and at least one rear lamp control unit connected to the light source and adapted to power the light source, wherein the rear lamp control unit is connected to the vehicle data bus and the power supply. The summary of the system according to the present invention is that the system further comprises a switch and a switch control unit connected to the switch and adapted to close the switch and to open the switch, wherein the switch is connected between the power supply and the rear lamp control unit, wherein the switch control unit is connected to the vehicle data bus.

An external circuit, consisting of the switch and the switch control unit, allows at least one rear lamp control unit to be disconnected from the power supply, wherein preferably all rear lamp control units are disconnected. As a result of this disconnection, neither the logic branch nor the power branch of the rear light control unit is powered, which reduces the power consumption of the whole system significantly. The power consumption of the external circuit is several times lower in comparison to the power consumption of the logic branch according to the state of the art, thus saving several Wh per day per one vehicle, which in case of the whole production series of the vehicles of, e.g., 100 000 pieces can represent approximately 1 MWh per day. From the ecological point of view, this is a very significant energy saving.

Preferably, the switch control unit is adapted to open the switch in response to receiving a sleep request from the vehicle data bus or the rear lamp control unit and to close the switch in response to receiving a wake-up request from the vehicle data bus. The disconnection of the respective rear lamp control units is thus realized by means of a simple connection, which is characterised by low production costs. For controlling the switch, the switch control unit comprises a microprocessor with a memory, in which the instructions for controlling the switch based on the respective requests are stored.

Preferably, the switch control unit is connected to the power supply and/or to the rear lamp control unit. Connecting the switch control unit to the power supply allows the switch control unit to be powered. A direct connection of these two mentioned control units can be used, for example, for sending the sleep request, however, this connection is not necessary, and the sleep request can be sent via the vehicle data bus.

Preferably, the rear lamp control unit comprises a logic branch and a power branch, wherein the power branch is connected to the light source and adapted to power the light source, and wherein the logic branch comprises a logic branch switch adapted to disconnect the power branch from the power source. This arrangement of the hybrid integrated circuit (the rear lamp control unit) allows the light source to be powered and is made to prevent the light source from burning out, and in particular, it allows the power branch to be disconnected from the logic branch, which leads to at least partial reduction in the power consumption. This power consumption is then further reduced by means of the above-mentioned external circuit.

Preferably, the logic branch is connected to the vehicle data bus, wherein this connection allows the vehicle data bus to communicate with the rear lamp control unit. Thus, sending various requests, e.g., a low power consumption mode request, is allowed.

Preferably, the vehicle data bus is a CAN bus or a LIN bus. These types of vehicle data buses allow fast and reliable communication between the individual vehicle modules, and in the case of the present invention, they allow reliable communication with the rear lamp control unit and the switch control unit.

Preferably, the power supply is a vehicle battery, that is, a power supply that is typically present in every vehicle. Therefore, it is not necessary to add additional power supply to the vehicle.

Preferably, the switch control unit comprises a transceiver, wherein this element is easily available, and it allows reliable communication between the vehicle data bus, the rear lamp control unit, and the switch.

Furthermore, the disadvantages of the solutions known in the state of the art are to some extent also eliminated by a method for reducing the power consumption of the vehicle rear lamp using the system according to the present invention, wherein the summary of this method is that it comprises steps of: sending the sleep request to the switch control unit, and opening the switch, based on the sleep request, to disconnect at least one rear lamp control unit from the power supply.

Due to the method according to the present invention, powering of the rear lamp control unit is completely interrupted, which means that neither the logic nor the power branches are powered. This significantly reduces the power consumption of the whole system, wherein in comparison to the state of the art, several Wh per day per one vehicle can be saved, which in case of the whole production series of vehicles of, e.g., 100 000 pieces can represent approximately 1 MWh per day.

Preferably, the sleep request is sent from the rear lamp control unit. The sleep request represents a command for the switch control unit to open the switch.

Preferably, the sleep request is sent from the vehicle data bus. This request can be sent via the rear lamp control unit or directly from the vehicle data bus to the switch control unit.

Before the step of sending the sleep request to the switch control unit, the method according to the present invention preferably comprises a step of: sending the low power consumption mode request to the rear lamp control unit, wherein the sleep request in the step of sending the sleep request to the switch control unit is sent based on the low power consumption mode request.

The step of sending the low power consumption mode request allows to subsequently switch to the low power consumption mode when it is desired, e.g., when the driver of the vehicle opts for the low power consumption mode. The low power consumption mode request can be sent, e.g., based on the manipulation with a control element (turn signal lever, on-board computer, etc.). This control element can be manipulated, e.g., by the driver or another person in the vehicle.

After the step of opening the switch, the method according to the present invention preferably comprises the steps of: sending the wake-up request to the switch control unit, and closing the switch, based on the wake-up request, to connect at least one rear lamp control unit to the power supply.

Waking up the rear lamp control units allows the low power consumption mode to end and to return to the standard state, where the rear lamp control units are powered from the power supply and can communicate with the vehicle data bus.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

The invention will be further described by means of exemplary embodiments with reference to the respective drawings.

Figure 1:
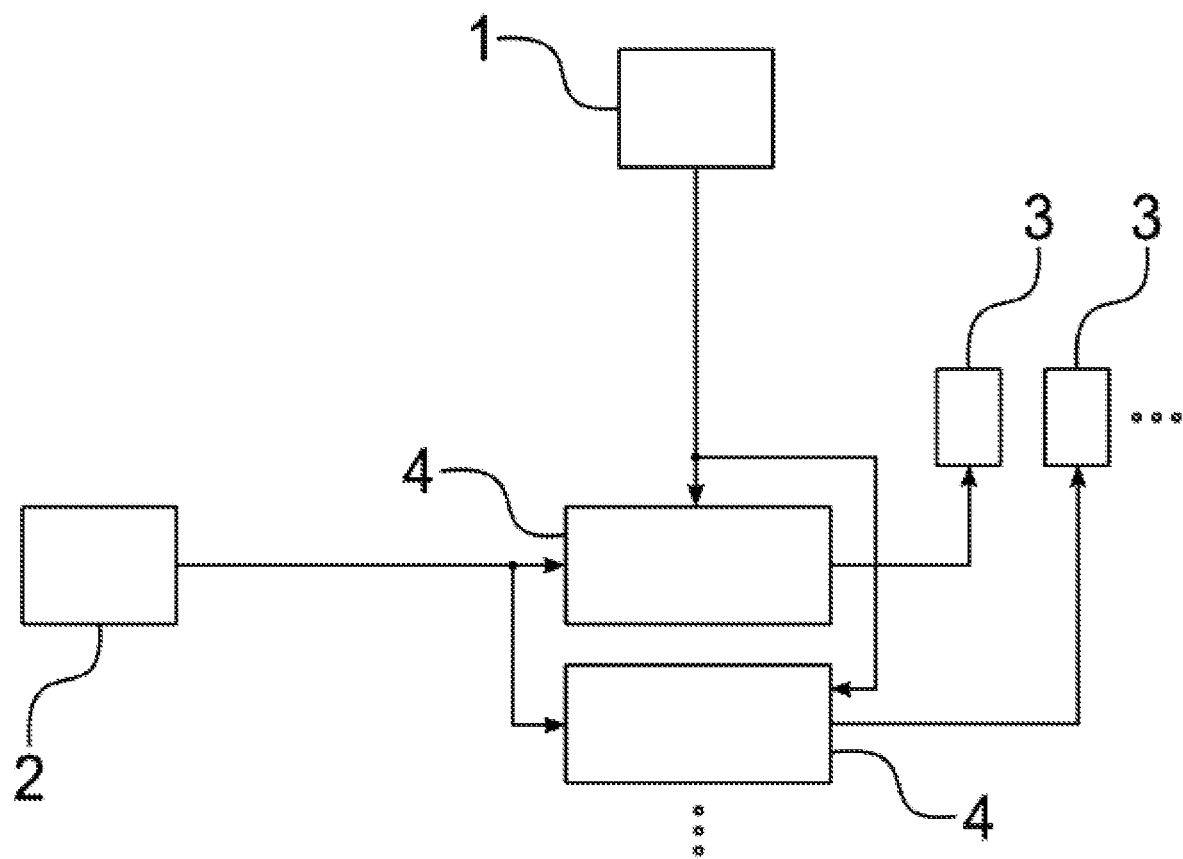
FIG. 1 shows a block diagram of a system according to the state of the art.
Figure 2:
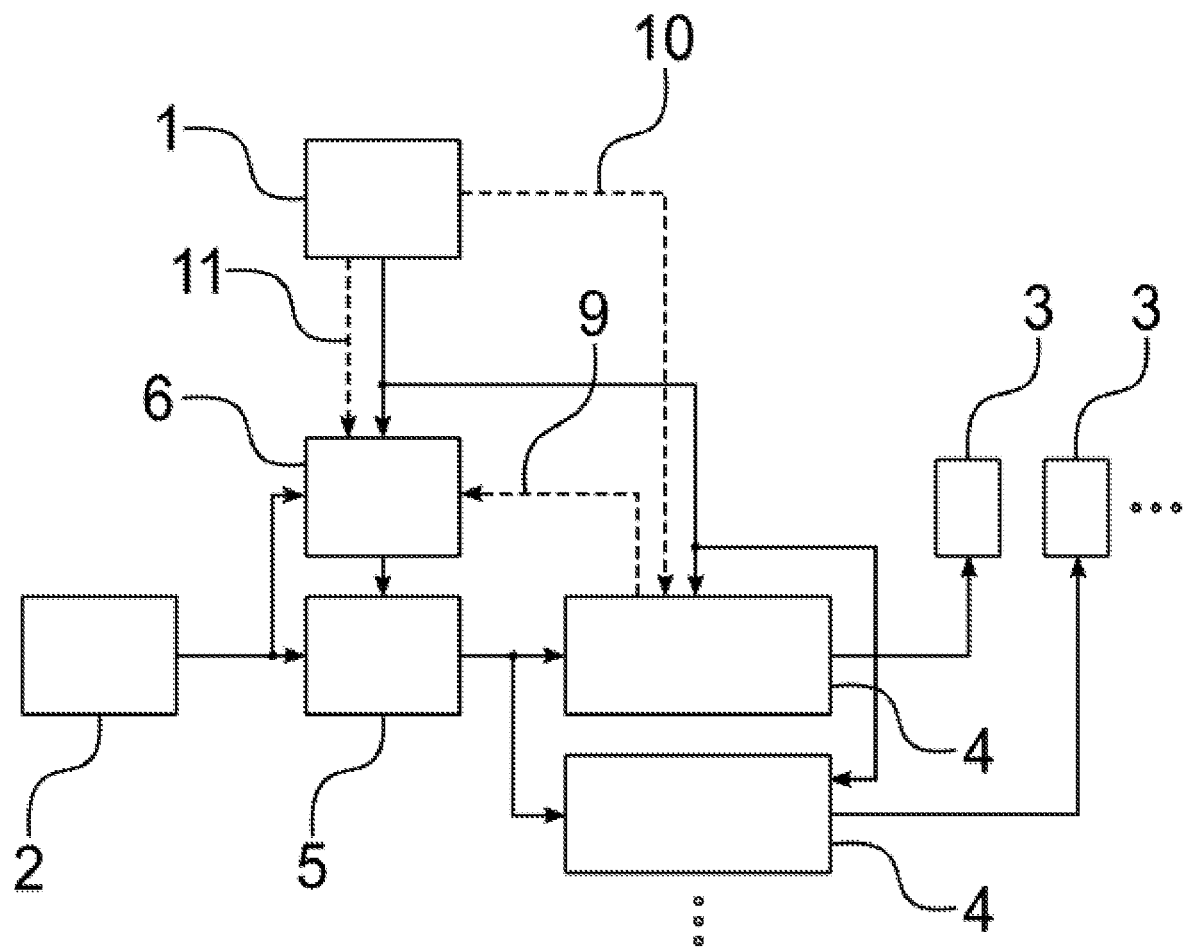
FIG. 2 shows a block diagram of a system according to the first exemplary embodiment of the present invention.

In the first exemplary embodiment, as shown in FIG. 2, a system for reducing a power consumption of a vehicle rear lamp comprises a vehicle data bus 1, a power supply 2, at least one light source 3, at least one rear lamp control unit 4 and an external circuit. The external circuit comprises a switch 5 and a switch control unit 6 connected to the switch 5 and adapted to close the switch 5 and to open the switch 5. As can be seen in FIG. 2, the switch 5 is connected between the power supply 2 and the rear lamp control unit 4, while these components (the switch 5 and the switch control unit 6) are not present in the solution shown in FIG. 1 which depicts a system according to the state of the art. The system according to the present invention can be part of a rear lamp.

The rear lamp control unit 4 is connected to the vehicle data bus 1 and the power supply 2. In the first exemplary embodiment, the rear lamp control unit 4 is implemented as a hybrid integrated circuit, the simplified arrangement of which can be seen in FIG. 3. The rear lamp control unit 4 comprises two power supply branches—a logic branch 7 adapted to power an internal logic of the hybrid integrated circuit, and a power branch 8 adapted to power the light source 3, for example a LED. The internal logic is implemented as a circuit comprising a microprocessor with a memory, wherein one or more programs are loaded into this memory. This circuit then, based on the commands from the vehicle data bus 1, runs the respective program. For example, if it receives a "blinker" command, it runs the LED gradual flashing function.

Figure 3:
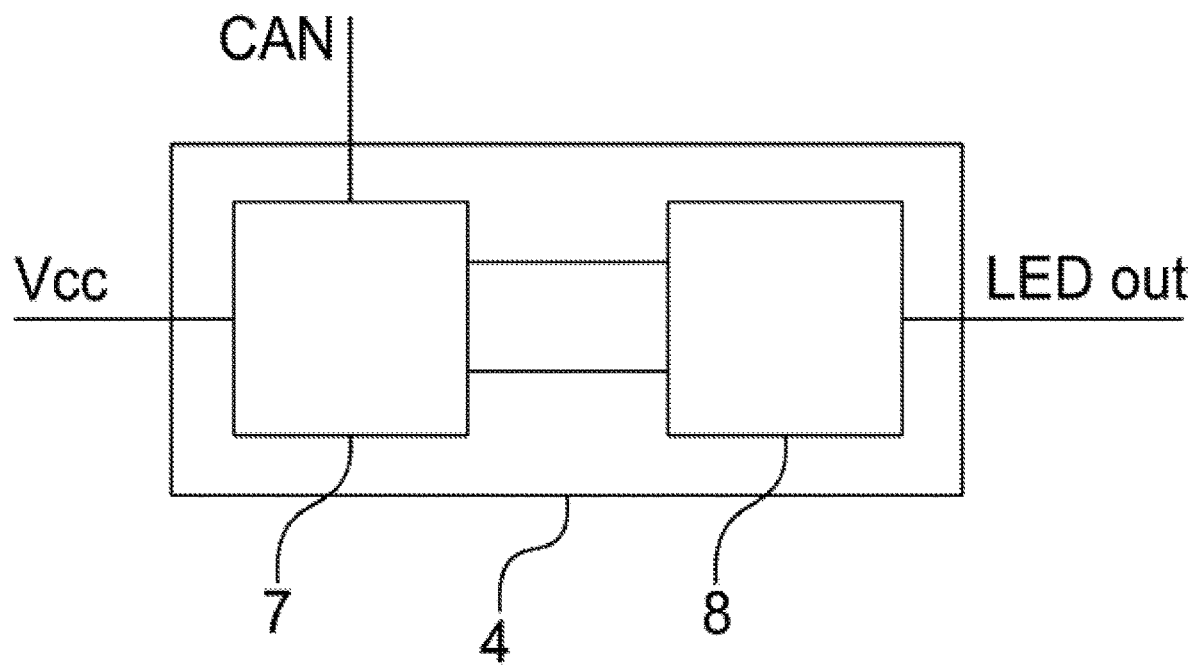
FIG. 3 shows a simplified arrangement of the rear lamp control unit.

As shown in FIG. 3, the vehicle data bus 1 and the power supply 2 are both connected to the logic branch 7 of the rear lamp control unit 4, as indicated by the respective labels "CAN" standing for a CAN (Controller Area Network) bus and "Vcc" standing for so-called Voltage Common Collector—i.e., the power supply 2 of the system. In the first exemplary embodiment, the vehicle data bus 1 is implemented as a CAN bus and the power supply 2 is implemented as a vehicle battery. Alternatively, the vehicle data bus 1 can be implemented as a different type of a bus, e.g., a LIN (Local Interconnect Network) bus. Any data bus which allows to control the rear lamp control unit 4 and the switch control unit 6, as it is more specifically described below, can be used. For example, the vehicle data bus 1 is adapted for sending various requests to the rear lamp control unit 4 and/or the switch control unit 6. Alternatively, the power supply 2 can be implemented as a different type of the power source than the vehicle battery if such power source can power to the rear lamp control unit 4.

Powering of the rear lamp control unit 4 is implemented in such a way that the logic branch 7 is powered by the power supply 2, wherein the logic branch 7 is connected to the power branch 8 by two connections, as shown in FIG. 3. The first connection serves for powering the power branch 8, wherein the logic branch 7 comprises a logic branch switch. The logic branch switch can be closed to connect the logic branch 7 to the power branch 8 and to allow powering of the power branch 8 or it can be opened to disconnect the first connection between the logic branch 7 and the power branch 8. By disconnecting this first connection, powering of the power branch 8 is not allowed. Opening of the logic branch switch can be done based on an OFF command received by the rear lamp control unit 4 from the vehicle data bus 1. Sending of this OFF command to the hybrid integrated circuit is known from the state of the art, as well as the second connection shown in FIG. 3 between the logic branch 7 and the power branch 8. The detailed arrangement of the hybrid integrated circuit would be known to the person skilled in the art, because such hybrid integrated circuit is commonly used in the state of the art. This hybrid integrated circuit comprises the microprocessor which has outputs with low power towards the power branch 8. If the light sources 3 were connected to these outputs directly, they would burn out, and therefore a current amplifier circuit (typically formed by a power transistor, e.g., of the MOS-FET type) is connected to them, that is to each output separately. The set of components around this element also has its own circuit and another switch controlled by the output of the microprocessor, which switches off this part internally. The second connection therefore corresponds to the connection between the microprocessor and the power transistors.

When the logic branch switch is closed, the power branch 8 is powered and the power branch 8 powers the light source 3, since the light source 3 is connected to the rear lamp control unit 4, more specifically, to the power branch 8 of the rear lamp control unit 4. In FIG. 3, this is indicated by the respective label "LED out", which indicates that in the first exemplary embodiment, the light source 3 comprises a LED. Alternatively, the light source 3 can be implemented as a different type of the light source 3. In the first exemplary embodiment, the system comprises two and more light sources 3, which can correspond to different types of lights, which are part of the rear lamp module. For example, the first light source 3 can correspond to a signal light, the second light source 3 can correspond to a brake light, another light source 3 can correspond to a fog light, etc. Each light source 3 has its own rear lamp control unit 4.

In FIG. 2 (as well as in FIG. 1), the possibility of providing plurality of light sources 3 and plurality of respective rear lamp control units 4 is indicated by a row of dots. Each rear lamp control unit 4 thus comprises two inputs ("CAN", "Vcc") to connect the vehicle data bus 1 and the power supply 2, and one output ("LED out") to connect to the light source 3. Rear lamp control units 4 are connected in parallel to the vehicle data bus 1, and they are connected in parallel to the power supply 2, more specifically, to the switch 5, which is connected between the power supply 2 and the rear lamp control units 4.

When the logic branch switch is opened (based on the OFF command), the power branch 8 is not powered. However, in this case, the power consumption is not sufficiently low, because the logic branch 7 is still powered. For this purpose, the system according to the present invention comprises the external circuit to disconnect the rear lamp control units 4 from the power supply 2. By disconnecting the rear lamp control units 4 from the power supply 2, the power consumption of the rear lamp is significantly and sufficiently reduced, because even the logic branch 7 of the respective rear lamp control unit 4 is not powered. As was already mentioned above, the external circuit comprises the switch 5 and the switch control unit 6 connected to the switch 5 and adapted to close the switch 5 and to open the switch 5, wherein the switch 5 and the switch control unit 6 are external relative to the rear lamp control unit 4, i.e., they are not part of the rear lamp control unit 4.

In the first exemplary embodiment, the switch control unit 6 comprises a transceiver and is connected to the vehicle data bus 1, the power supply 2 and the switch 5. The switch control unit 6 further also comprises the microprocessor with the memory, in which the instructions for controlling the switch 5 based on the respective requests are stored. The switch control unit 6 is connected to the vehicle data bus 1 between the vehicle data bus 1 and the switch 5. More specifically, the switch control unit 6 is connected to the vehicle data bus 1 and the switch 5 and the switch 5 is connected to the power supply input ("Vcc", as can be seen in FIG. 3) of the rear lamp control unit 4. Alternatively, the switch control unit 6 is not connected to the power supply 2 and can be powered differently, for example, from the vehicle data bus 1. Alternatively, the switch control unit 6 is further connected directly to the rear lamp control unit 4 for communication between the rear lamp control unit 4 and the switch control unit 6. However, in the first exemplary embodiment, the communication between the rear lamp control unit 4 and the switch control unit 6 is provided by the vehicle data bus 1 being connected to the rear lamp control unit 4 and the switch control unit 6. For controlling the switch 5, it is necessary to supply voltage to the switch control unit 6 based on the respective requests, which will be described below.

A method for reducing the power consumption of the vehicle rear lamp which can be performed by the system according to the present invention will now be described.

Figure 5:
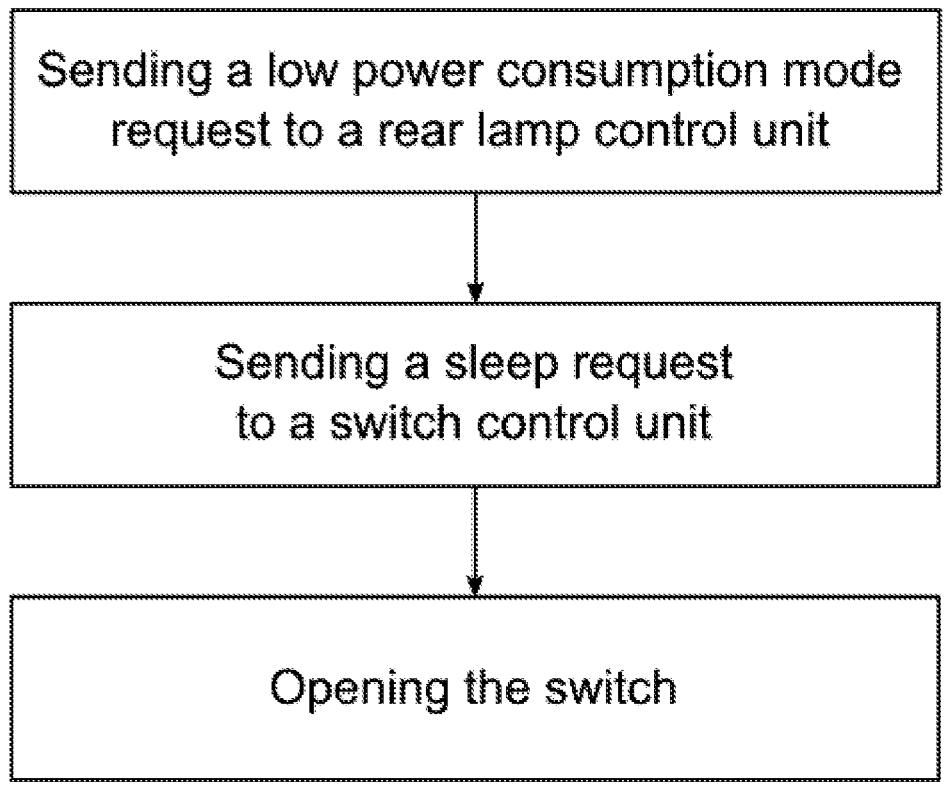
FIG. 5 shows a flowchart of another exemplary method according to the present invention.

In an exemplary embodiment, as shown in FIG. 5, this method comprises the steps of: sending a low power consumption mode request 10 to the rear lamp control unit 4; sending a sleep request 9 to the switch control unit 6, wherein the sleep request 9 is sent based on the low power consumption mode request 10; and opening the switch 5, based on the sleep request 9, to disconnect at least one rear lamp control unit 4 from the power supply 2.

Figure 4:
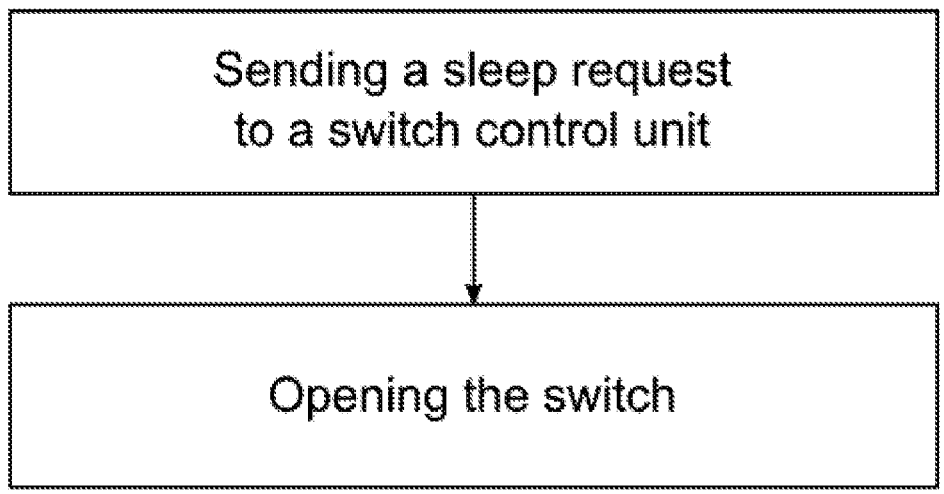
FIG. 4 shows a flowchart of an exemplary method according to the present invention.

In this exemplary embodiment, the low power consumption mode request 10 is sent from the vehicle data bus 1 to the rear lamp control unit 4, as shown in FIG. 2 using a dashed line, and the sleep request 9 is then sent from the rear lamp control unit 4 to the switch control unit 6, as shown in FIG. 2 using another dashed line. The sleep request 9 can be sent from the rear lamp control unit 4 to the switch control unit 6 via the vehicle data bus 1 or alternatively, via the direct connection between the rear lamp control unit 4 and the switch control unit 6. Alternatively, the sleep request 9 can be sent to the switch control unit 6 from the vehicle data bus 1. The first step of this method, i.e., the step of sending the low power consumption mode request 10, is preferred and optional because it allows the low power consumption mode to be started when it is desirable. Therefore, FIG. 4 shows an exemplary embodiment of the method where the step of sending the low power consumption mode request 10 is omitted.

The switch control unit 6 then, based on the sleep request 9, opens the switch 5, and all rear lamp control units 4 are disconnected from the power supply 2, more specifically, the logic branch 7 of each rear lamp control unit 4 is disconnected from the power supply 2. Therefore, the rear lamp control unit 4 is completely unpowered—i.e., the logic branch 7 is not powered and the power branch 8 is not powered. Consequently, the vehicle data bus 1 can communicate only with the switch control unit 6 and not with the rear lamp control unit 4. By disconnecting each rear lamp control unit 4 from the power supply 2, the power consumption of the whole system is reduced significantly in comparison to the state of the art, where the logic branch 7 is always powered, since there is no external circuit to disconnect it from the power supply 2. In the present invention, the power consumption of the external circuit is several times lower in comparison to the power consumption of the logic branch 7 according to the state of the art. This can save several Wh per day per one vehicle, which in case of the whole production series of vehicles of, e.g., 100 000 pieces can represent approximately 1 MWh per day. Alternatively, not all rear lamp control units 4 are disconnected, but generally at least one rear lamp control unit 4, in particular, the rear lamp control units 4 to which the external circuit comprising the switch control unit 6 and the switch 5, as described above, is connected. To disconnect the other rear light control units 4, these rear lamp control units 4 would have to be connected to their own external circuit. Alternatively, some rear lamp control units 4 can be connected according to the state of the art, i.e., without the external circuit, however, there is not such significant reduction of the power consumption in this case as in case where all rear lamp control units 4 are disconnected.

Figure 6:
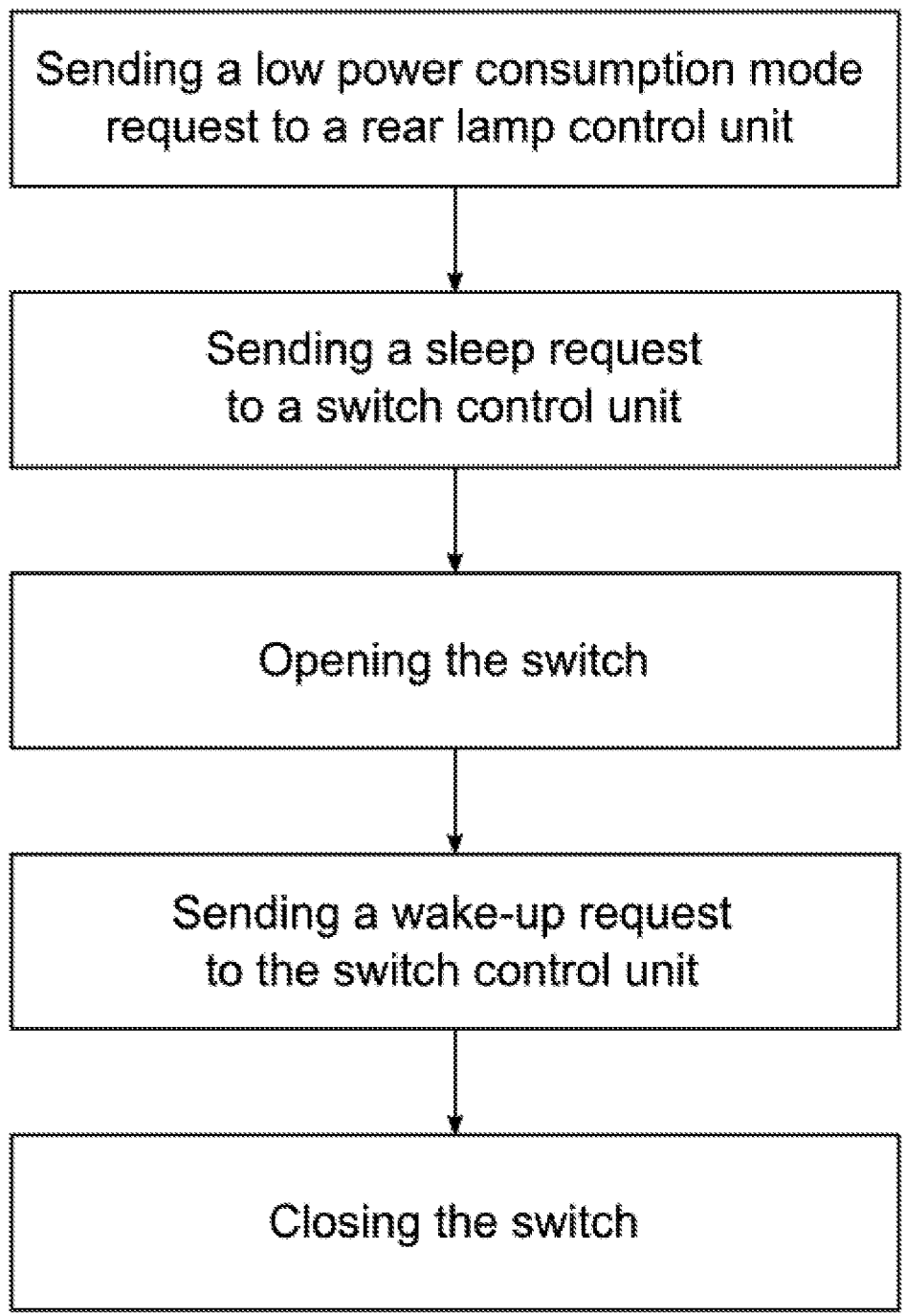
FIG. 6 shows a flowchart of another exemplary method according to the present invention.

In another exemplary embodiment, as shown in FIG. 6, the method further comprises the optional steps of sending a wake-up request 11 to the switch control unit 6 and closing the switch 5, based on the wake-up request 11, to connect at least one rear lamp control unit 4 to the power supply 2. The wake-up request 11 is sent from the vehicle data bus 1, as shown in FIG. 2 using the third dashed line. All three dashed lines correspond to the respective requests in order to show between which parts these requests are sent. These dashed lines do not correspond to the connections—the connections are shown using a solid line. These steps, i.e., the fourth and fifth step in FIG. 6, correspond to the situation when it is desirable to end the low power consumption mode, typically, when the lights are off and need to be turned on according to the program in the rear lamp control unit 4.

on and when the rear lamp control unit 4 needs to be powered again by the power supply 2 and needs to communicate again with the vehicle data bus 1.

The individual requests, in particular the low power consumption mode request 10 and the wake-up request 11, are sent from the vehicle data bus 1 to the rear lamp control unit 4 or to the switch control unit 6, based on the control of the respective control element. This control element can be controlled, e.g., by a driver and can be implemented in various embodiments, e.g., as a turn signal lever or an on-board computer. There can be several of these control elements in the vehicle, and they can be, e.g., dedicated separately to engine functions, optical functions, or safety functions.

LIST OF REFERENCE NUMBERS

1—vehicle data bus
2—power supply
3—light source
4—rear lamp control unit
5—switch
6—switch control unit
7—logic branch
8—power branch
9—sleep request
10—low power consumption mode request
11—wake-up request

The invention claimed is:

1. A system for reducing a power consumption of a vehicle rear lamp, the system comprising:
    a vehicle data bus,
    a power supply,
    at least one light source, and
    at least one rear lamp control unit connected to the at least one light source and powering the at least one light source,
    a switch and a switch control unit connected to the switch, and the switch control unit selectively closing the switch and opening the switch,
    wherein the at least one rear lamp control unit is connected to the vehicle data bus and the power supply,
    wherein the switch is connected between the power supply and the at least one rear lamp control unit,
    wherein the switch control unit is connected to the vehicle data bus,
    wherein the switch control unit opens the switch in response to receiving a sleep request from the vehicle data bus or the at least one rear lamp control unit.

2. The system according to claim 1, wherein the switch control unit closes the switch in response to receiving a wake-up request from the vehicle data bus.

3. The system according to claim 1, wherein the switch control unit is connected to the power supply and/or to the at least one rear lamp control unit.

4. The system according to claim 1, wherein the at least one rear lamp control unit includes a logic branch and a power branch, wherein the power branch is connected to the at least one light source and provides power to the at least one light source, and wherein the logic branch includes a logic branch switch selectively disconnecting the power branch from the power source.

5. The system according to claim 4, wherein the logic branch is connected to the vehicle data bus.

6. The system according to claim 1, wherein the vehicle data bus is a CAN bus or a LIN bus.

7. The system according to claim 1, wherein the power supply is a vehicle battery.

8. The system according to claim 1, wherein the switch control unit includes a transceiver.

9. A method for reducing the power consumption of the vehicle rear lamp using the system according to claim 1, the method comprising:
    sending the sleep request to the switch control unit, and
    opening the switch, based on the sleep request, to disconnect the at least one rear lamp control unit from the power supply.

10. The method according to claim 9, wherein the sleep request is sent from the at least one rear lamp control unit.

11. The method according to claim 10, wherein, before the sleep request is sent to the switch control unit, the method comprises:
    sending a low power consumption mode request to the at least one rear lamp control unit, wherein the sleep request is sent based on the low power consumption mode request.

12. The method according to claim 9, wherein the sleep request is sent from the vehicle data bus.

13. The method according to claim 9, wherein, after the switch is opened, the method comprises:
    sending a wake-up request to the switch control unit, and
    closing the switch, based on the wake-up request, to connect the at least one rear lamp control unit to the power supply.

14. A method for reducing the power consumption of the vehicle rear lamp using a system including a vehicle data bus, a power supply, at least one light source, at least one rear lamp control unit, a switch, and a switch control unit, wherein the at least one rear lamp control unit is connected to the at least one light source, the vehicle data bus, and the power supply, the at least one rear lamp control unit powering the at least one light source, wherein the switch control unit is connected to the switch and the vehicle data bus and selectively closes and opens the switch, wherein the switch is connected between the power supply and the at least one rear lamp control unit, and wherein the method comprises:

sending a sleep request to the switch control unit; and opening the switch, based on the sleep request, to disconnect the at least one rear lamp control unit from the power supply.

15. The method according to claim 14, wherein the sleep request is sent from the at least one rear lamp control unit.

16. The method according to claim 14, wherein the sleep request is sent from the vehicle data bus.

17. The method according to claim 14, wherein, before the sleep request is sent to the switch control unit, the method comprises:

sending a low power consumption mode request to the at least one rear lamp control unit, wherein the sleep request is sent based on the low power consumption mode request.

18. The method according to claim 14, wherein, after the switch is opened, the method comprises:

sending a wake-up request to the switch control unit, and closing the switch, based on the wake-up request, to connect the at least one rear lamp control unit to the power supply.

* * * * *